(12) United States Patent
Huang et al.

(10) Patent No.: US 12,446,219 B2
(45) Date of Patent: Oct. 14, 2025

(54) SMALL-AREA COMMON-VOLTAGE MULTI-WRITE NON-VOLATILE MEMORY ARRAY

(71) Applicant: YIELD MICROELECTRONICS CORP., Hsin-Chu County (TW)

(72) Inventors: Yu-Ting Huang, Hsin-Chu County (TW); Chi-Pei Wu, Hsin-Chu County (TW)

(73) Assignee: Yield Microelectronics Corp., Hsin-chu County (TW)

( * ) Notice: Subject to any disclaimer, the term of this patent is extended or adjusted under 35 U.S.C. 154(b) by 205 days.

(21) Appl. No.: 18/480,722

(22) Filed: Oct. 4, 2023

(65) Prior Publication Data
US 2025/0017005 A1    Jan. 9, 2025

(30) Foreign Application Priority Data
Jul. 6, 2023 (TW) .................. 112125174

(51) Int. Cl.
| | |
|---|---|
| G11C 5/06 | (2006.01) |
| G11C 16/04 | (2006.01) |
| G11C 16/10 | (2006.01) |
| G11C 16/20 | (2006.01) |
| G11C 16/26 | (2006.01) |
| H10B 41/35 | (2023.01) |
| H10B 41/70 | (2023.01) |

(52) U.S. Cl.
CPC ......... *H10B 41/70* (2023.02); *G11C 16/0441* (2013.01); *G11C 16/10* (2013.01); *G11C 16/20* (2013.01); *G11C 16/26* (2013.01); *H10B 41/35* (2023.02)

(58) Field of Classification Search
CPC ....... G11C 5/063; G11C 7/18; G11C 11/4097; G11C 5/025; G11C 5/04
USPC .......................................................... 365/63
See application file for complete search history.

(56) References Cited

U.S. PATENT DOCUMENTS
2019/0392885 A1* 12/2019 Bateman ................ G11C 5/025

FOREIGN PATENT DOCUMENTS
TW    202327053 A    7/2023

OTHER PUBLICATIONS
First Examination Report mailed to Taiwanese Counterpart Patent Application No. 112125174 on Apr. 18, 2024.

* cited by examiner

*Primary Examiner* — Son T Dinh
(74) *Attorney, Agent, or Firm* — Rosenberg, Klein & Lee

(57) ABSTRACT

A small-area common-voltage multi-write non-volatile memory array includes word lines, select lines, common-voltage lines, and sub-memory arrays. The word lines include a first word line and a second word line. The select lines include a first select line. The common-voltage lines are directly coupled together. The common-voltage lines include a first common-voltage line and a second common-voltage line. Each sub-memory array includes a first non-volatile memory cell coupled to the first word line, the first select line, and the first common-voltage line and a second non-volatile memory cell coupled to the second word line, the first select line, and the second common-voltage line.

22 Claims, 6 Drawing Sheets

SMALL-AREA COMMON-VOLTAGE MULTI-WRITE NON-VOLATILE MEMORY ARRAY

This application claims priority for the TW patent application No. 112125174 filed on 6 Jul. 2023, the content of which is incorporated by reference in its entirely.

BACKGROUND OF THE INVENTION

Field of the Invention

The present invention relates to a memory array, particularly to a small-area common-voltage multi-write non-volatile memory array.

Description of the Related Art

The Complementary Metal Oxide Semiconductor (CMOS) technology has been developed as a commonly used process for fabricating Application Specific Integrated Circuits (ASIC). Nowadays, as the computer information products are blooming, flash memories and Electrically Erasable Programmable Read Only Memory (EEPROM) have been widely used in electronic products since the data stored within will not volatilize but can be erased and programmed electrically. In addition, the data will not disappear even after the power is turned off.

Non-volatile memories are programmable and are able to adjust gate voltages of their transistors by storing charges, or to preserve the original gate voltages of transistors by not storing charges. When regarding to erase a non-volatile memory, the charges stored in the non-volatile memory are removed to resume the initial state of the memory, and return to its original gate voltages of the transistors. When the non-volatile memory is programmed, its internal switches will be turned off or turned on. In order to program the non-volatile memory array, a certain voltage and current need to be applied, so that the corresponding switches can be turned on or off. These programming signals need to pass through the decoder to be transmitted to the correct position of the non-volatile memory array. However, the decoder increases the overall area of the non-volatile memory array.

To overcome the abovementioned problems, the present invention provides a small-area common-voltage multi-write non-volatile memory array, so as to solve the aforementioned problems of the prior art.

SUMMARY OF THE INVENTION

The present invention provides a small-area common-voltage multi-write non-volatile memory array, which reduces the number of decoders and the overall area.

In an embodiment of the present invention, a small-area common-voltage multi-write non-volatile memory array is provided. The small-area common-voltage multi-write non-volatile memory array includes a plurality of word lines, a plurality of select lines, a plurality of common-voltage lines, and a plurality of sub-memory arrays. The word lines, arranged in parallel, include a first word line and a second word line. The select lines, which are arranged in parallel and perpendicular to the word lines, include a first select line. The common-voltage lines are arranged in parallel. The common-voltage lines perpendicular to the select lines are directly coupled together. The common-voltage lines include a first common-voltage line and a second common-voltage line. The first word line and the second word line are respectively close to the first common-voltage line and the second common-voltage line. Each sub-memory array is coupled to two word lines, one select line, and two common-voltage lines. Each sub-memory array includes a first non-volatile memory cell and a second non-volatile memory cell. The first non-volatile memory cell is coupled to the first word line, the first select line, and the first common-voltage line. The second non-volatile memory cell is coupled to the second word line, the first select line, and the second common-voltage line.

In an embodiment of the present invention, the first non-volatile memory cell and the second non-volatile memory cell are arranged symmetric to each other.

In an embodiment of the present invention, the first non-volatile memory cell and the second non-volatile memory cell are formed in a P-type semiconductor region. The first non-volatile memory cell includes a first gate dielectric block, a first common-voltage gate, a first N-type doped region, a second N-type doped region, and a third N-type doped region. The first gate dielectric block, formed on the P-type semiconductor region and arranged between the first word line and the semiconductor region, includes a high dielectric constant material. The first common-voltage gate is formed on the first gate dielectric block and coupled to the first common-voltage line. The first common-voltage gate is closer to the first common-voltage line than the first word line. The first common-voltage gate includes high dielectric constant metal. The first N-type doped region, the second N-type doped region, and the third N-type doped region are formed in the P-type semiconductor region. The first N-type doped region and the second N-type doped region are respectively formed on two opposite side of the P-type semiconductor region, which is directly arranged under the first word line. The second N-type doped region and the third N-type doped region are respectively formed on two opposite side of the P-type semiconductor region, which is directly arranged under the first common-voltage gate. The first N-type doped region is coupled to the first select line.

In an embodiment of the present invention, the second non-volatile memory cell includes a second gate dielectric block, a second common-voltage gate, a fourth N-type doped region, a fifth N-type doped region, and a sixth N-type doped region. The second gate dielectric block, formed on the P-type semiconductor region and arranged between the second word line and the P-type semiconductor region, includes a high dielectric constant material. The second common-voltage gate is formed on the second gate dielectric block and coupled to the second common-voltage line. The second common-voltage gate is closer to the second common-voltage line than the second word line. The second common-voltage gate includes high dielectric constant metal. The fourth N-type doped region, the fifth N-type doped region, and the sixth N-type doped region are formed in the P-type semiconductor region. The fourth N-type doped region and the fifth N-type doped region are respectively formed on two opposite side of the P-type semiconductor region, which is directly arranged under the second word line. The fifth N-type doped region and the sixth N-type doped region are respectively formed on two opposite side of the P-type semiconductor region, which is directly arranged under the second common-voltage gate. The fourth N-type doped region is coupled to the first select line.

In an embodiment of the present invention, when the first non-volatile memory cell is selected to perform a forming activity, the first common-voltage line is coupled to a middle voltage, the first word line is coupled to the middle voltage or a low voltage, and the first select line is coupled to a grounding voltage. The middle voltage is higher than the low voltage and the middle voltage and the low voltage are higher than the grounding voltage.

In an embodiment of the present invention, when the first non-volatile memory cell is not selected to perform a forming activity, the first common-voltage line is coupled to a middle voltage, the first word line is coupled to a grounding voltage, and the first select line is coupled to a biasing voltage or electrically floating. The middle voltage is higher than the biasing voltage and the biasing voltage is higher than the grounding voltage.

In an embodiment of the present invention, when the first non-volatile memory cell is selected to perform a setting activity, the first common-voltage line is coupled to a half of a middle voltage, the first word line is coupled to the middle voltage or a low voltage, and the first select line is coupled to a grounding voltage. The middle voltage is higher than the low voltage and the middle voltage and the low voltage are higher than the grounding voltage.

In an embodiment of the present invention, when the first non-volatile memory cell is not selected to perform a setting activity, the first common-voltage line is coupled to a half of a middle voltage, the first word line is coupled to a grounding voltage, and the first select line is coupled to a biasing voltage or electrically floating. The middle voltage is higher than the biasing voltage and the biasing voltage is higher than the grounding voltage.

In an embodiment of the present invention, when the first non-volatile memory cell is selected to perform a resetting activity, the first common-voltage line is coupled to a grounding voltage, the first word line is coupled to a middle voltage or a low voltage, and the first select line is coupled to a half of the middle voltage. The middle voltage is higher than the low voltage and the middle voltage and the low voltage are higher than the grounding voltage.

In an embodiment of the present invention, when the first non-volatile memory cell is not selected to perform a resetting activity, the first common-voltage line, the first word line, and the first select line are coupled to a grounding voltage.

In an embodiment of the present invention, when the first non-volatile memory cell is selected to perform a reading activity, the first common-voltage line is coupled to a grounding voltage, the first word line is coupled to a middle voltage or a low voltage, and the first select line is coupled to a biasing voltage. The middle voltage is higher than the low voltage and the middle voltage and the low voltage are higher than the biasing voltage.

In an embodiment of the present invention, when the first non-volatile memory cell is not selected to perform a reading activity, the first common-voltage line, the first word line, and the first select line are coupled to a grounding voltage.

In an embodiment of the present invention, when the second non-volatile memory cell is selected to perform a forming activity, the second common-voltage line is coupled to a middle voltage, the second word line is coupled to the middle voltage or a low voltage, and the first select line is coupled to a grounding voltage. The middle voltage is higher than the low voltage and the middle voltage and the low voltage are higher than the grounding voltage.

In an embodiment of the present invention, when the second non-volatile memory cell is not selected to perform a forming activity, the second common-voltage line is coupled to a middle voltage, the second word line is coupled to a grounding voltage, and the first select line is coupled to a biasing voltage or electrically floating. The middle voltage is higher than the biasing voltage and the biasing voltage is higher than the grounding voltage.

In an embodiment of the present invention, when the second non-volatile memory cell is selected to perform a setting activity, the second common-voltage line is coupled to a half of a middle voltage, the second word line is coupled to the middle voltage or a low voltage, and the first select line is coupled to a grounding voltage. The middle voltage is higher than the low voltage and the middle voltage and the low voltage are higher than the grounding voltage.

In an embodiment of the present invention, when the second non-volatile memory cell is not selected to perform a setting activity, the second common-voltage line is coupled to a half of a middle voltage, the second word line is coupled to a grounding voltage, and the first select line is coupled to a biasing voltage or electrically floating. The middle voltage is higher than the biasing voltage and the biasing voltage is higher than the grounding voltage.

In an embodiment of the present invention, when the second non-volatile memory cell is selected to perform a resetting activity, the second common-voltage line is coupled to a grounding voltage, the second word line is coupled to a middle voltage or a low voltage, and the first select line is coupled to a half of the middle voltage. The middle voltage is higher than the low voltage and the middle voltage and the low voltage are higher than the grounding voltage.

In an embodiment of the present invention, when the second non-volatile memory cell is not selected to perform a resetting activity, the second common-voltage line, the second word line, and the first select line are coupled to a grounding voltage.

In an embodiment of the present invention, when the second non-volatile memory cell is selected to perform a reading activity, the second common-voltage line is coupled to a grounding voltage, the second word line is coupled to a middle voltage or a low voltage, and the first select line is coupled to a biasing voltage. The middle voltage is higher than the low voltage and the middle voltage and the low voltage are higher than the biasing voltage.

In an embodiment of the present invention, when the second non-volatile memory cell is not selected to perform a reading activity, the second common-voltage line, the second word line, and the first select line are coupled to a grounding voltage.

In an embodiment of the present invention, the P-type semiconductor region is a P-type semiconductor substrate.

In an embodiment of the present invention, the P-type semiconductor region is a P-type doped well and the P-type doped well is formed in an N-type semiconductor substrate.

To sum up, the embodiments of the small-area common-voltage multi-write non-volatile memory array couples the common-voltage lines together to reduce the number of decoders and the overall area.

Below, the embodiments are described in detail in cooperation with the drawings to make easily understood the technical contents, characteristics and accomplishments of the present invention.

DETAILED DESCRIPTION OF THE INVENTION

Figure 1:
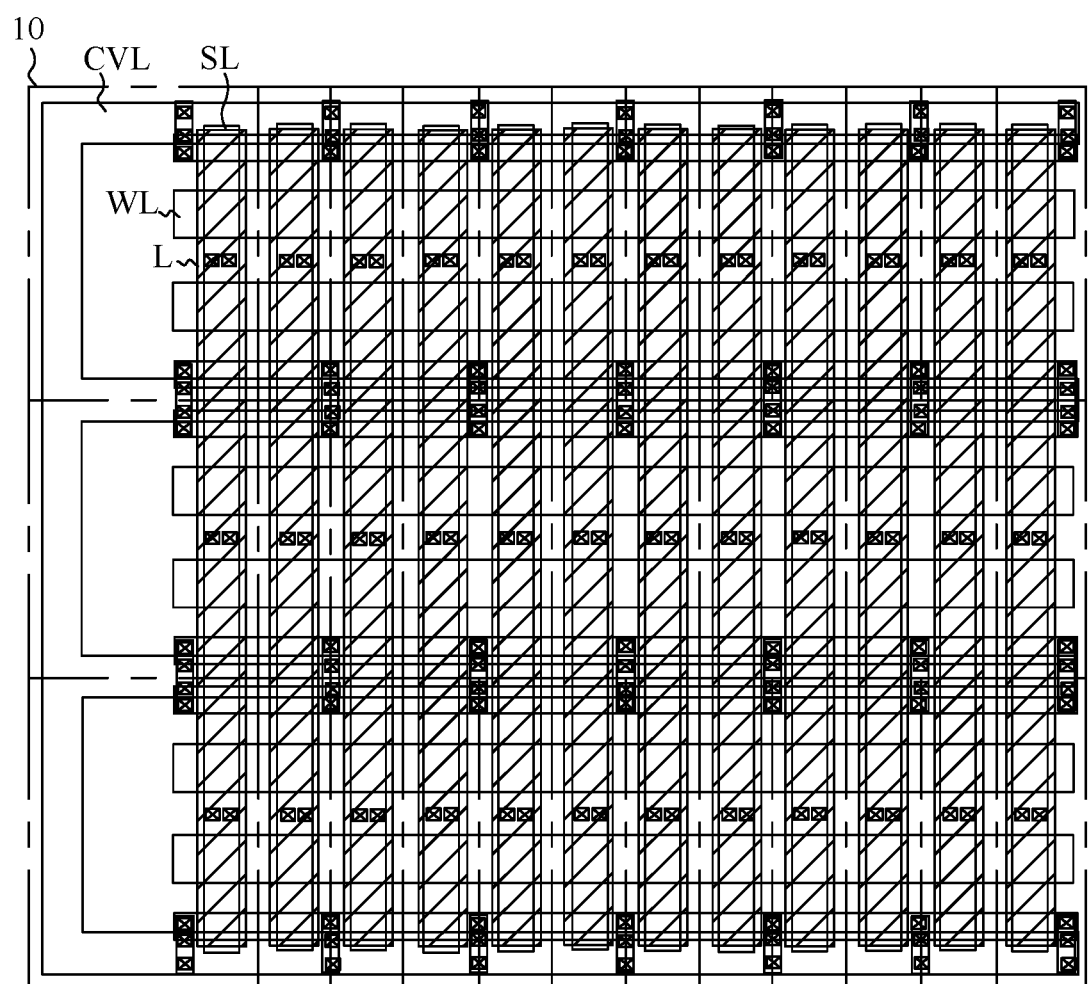
FIG. 1 is a schematic diagram illustrating the circuit layout a small-area common-voltage multi-write non-volatile memory array according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to using different names. This disclosure does not intend to distinguish between components that differ in name but in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

In the following description, a small-area common-voltage multi-write non-volatile memory array will be provided, which couples the common-voltage lines together to reduce the number of decoders and the overall area.

Figure 2:
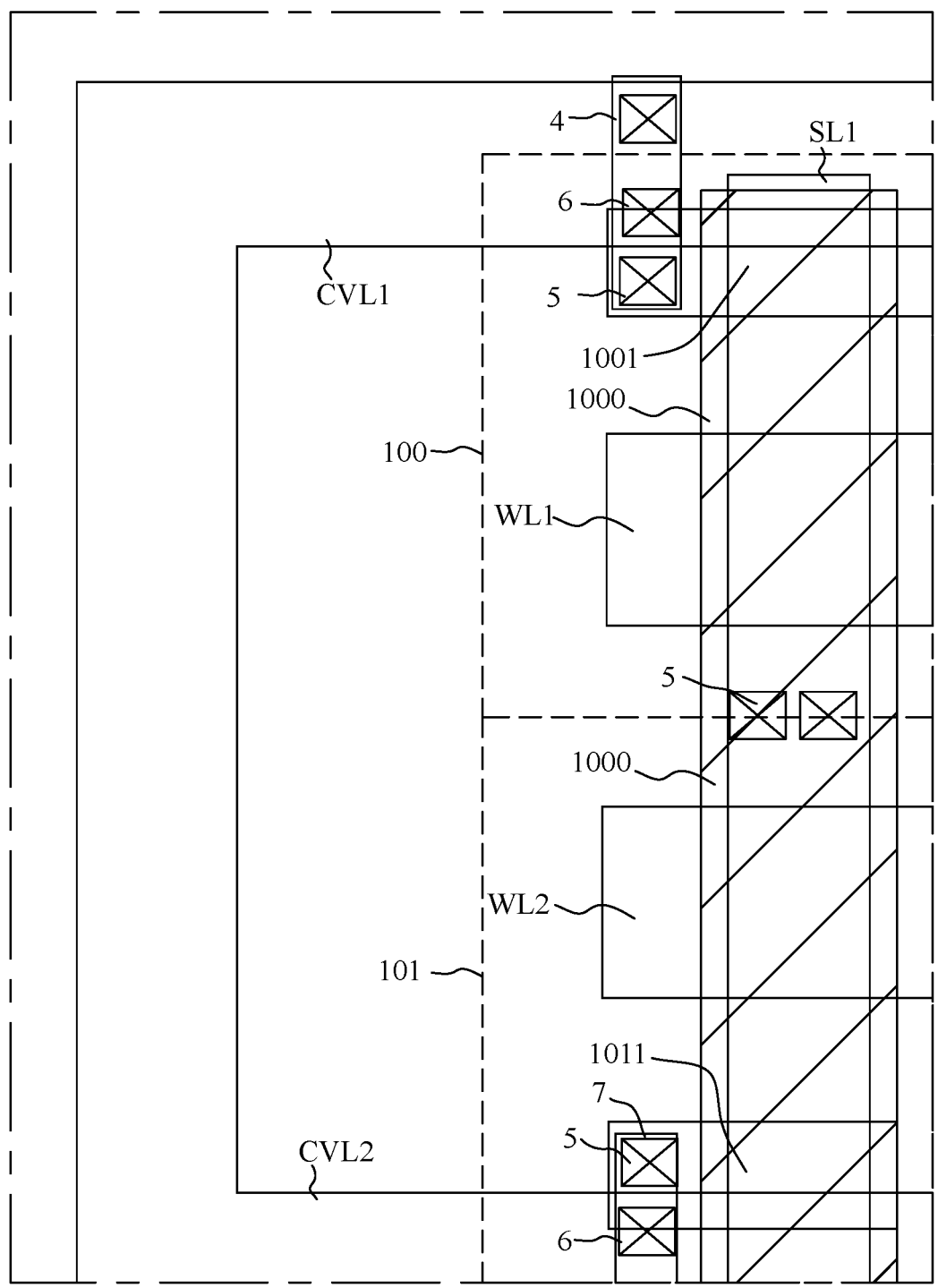
FIG. 2 is a schematic diagram illustrating the circuit layout of a sub-memory array according to an embodiment of the present invention.

FIG. 1 is a schematic diagram illustrating the circuit layout a small-area common-voltage multi-write non-volatile memory array according to an embodiment of the present invention. FIG. 2 is a schematic diagram illustrating the circuit layout of a sub-memory array according to an embodiment of the present invention. Referring to FIG. 1 and FIG. 2, a small-area common-voltage multi-write non-volatile memory array 1 of the present invention is introduced as follows. The small-area common-voltage multi-write non-volatile memory array 1 includes a plurality of word lines WL arranged in parallel, a plurality of select lines SL arranged in parallel, a plurality of common-voltage lines CVL arranged in parallel, and a plurality of sub-memory arrays 10. The word lines WL includes a first word line WL1 and a second word line WL2. The word lines WL are perpendicular to the select lines SL. The select lines SL include a first select line SL. The common-voltage lines CVL are perpendicular to the select lines SL. The ends of the common-voltage lines CVL on the same side are directly coupled together. The common-voltage lines CVL include a first common-voltage line CVL1 and a second common-voltage line CVL2. The first word line WL1 and the second word line WL2 are respectively close to the first common-voltage line CVL1 and the second common-voltage line CVL2. Each sub-memory array 10 is coupled to two of the word lines WL, one of the select lines SL, and two of the common-voltage lines CVL. Each sub-memory array 10 includes a first non-volatile memory cell 100 and a second non-volatile memory cell 101. The first non-volatile memory cell 100 is coupled to the first word line WL1, the first select line SL1, and the first common-voltage line CVL1. The second non-volatile memory cell 101 is coupled to the second word line WL2, the first select line SL1, and the second common-voltage line CVL2. In some embodiments of the present invention, the first non-volatile memory cell 100 and the second non-volatile memory cell 101 are arranged symmetric to each other.

Figure 3:
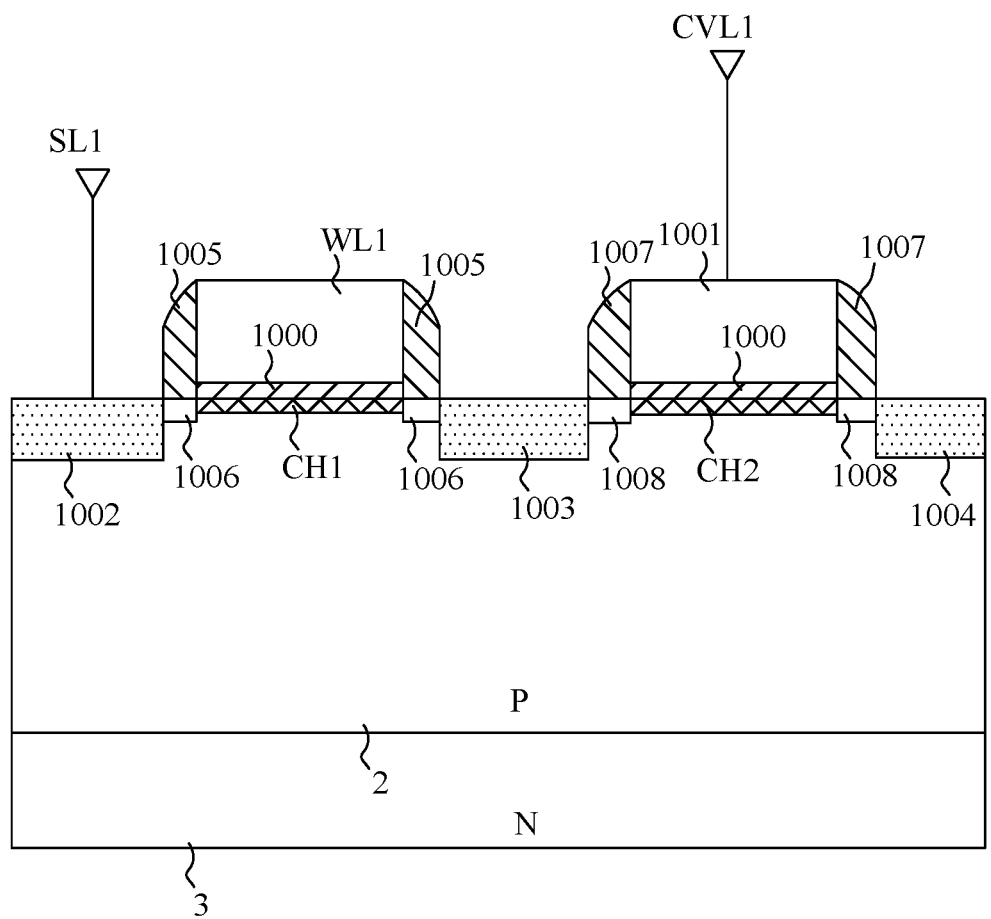
FIG. 3 is a cross-sectional view of a first non-volatile memory cell according to an embodiment of the present invention.

FIG. 3 is a cross-sectional view of a first non-volatile memory cell according to an embodiment of the present invention. Referring to FIG. 3 and FIG. 2, the first non-volatile memory cell 100 is formed in a P-type semiconductor region 2. For example, the P-type semiconductor region 2 is a doped well formed in an N-type semiconductor substrate 3. The first non-volatile memory cell 100 includes a first gate dielectric block 1000, a first common-voltage gate 1001, a first N-type doped region 1002, a second N-type doped region 1003, and a third N-type doped region 1004. The first gate dielectric block 1000 is a part of a gate dielectric layer L in FIG. 1. The first common-voltage gate 1001 and the word lines WL in FIG. 1 are a part of an electrode layer. The electrode layer, the first common-voltage gate 1001, and the word lines WL may include high dielectric constant metal. The high dielectric constant metal may be, but not limited to, hafnium. The first gate dielectric block 1000 and the gate dielectric layer L may include a high dielectric constant material. The high dielectric constant material may include, but not limited to, hafnium oxide. The select lines SL in FIG. 1 are a part of a first conductive metal layer. The common-voltage lines CVL in FIG. 1 are a part of a second conductive metal layer. The electrode layer, the first conductive metal layer, and the second conductive metal layer are sequentially formed from bottom to top. The first gate dielectric block 1000 is formed on the P-type semiconductor region 2 and located between the first word line WL1 and the P-type semiconductor region 2. The first common-voltage gate 1001 is formed on the first gate dielectric block 1000 and coupled to the first common-voltage line CVL1. The first common-voltage gate 1001 is closer to the first common-voltage line CVL1 than the first word line WL1. Specifically, the first common-voltage gate 1001 overlaps a first conductive metal block 4. The first conductive metal block 4 is a part of the first conductive metal layer. There is a conduction via 5 is formed between the first common-voltage gate 1001 and the first conductive metal block 4. The first common-voltage gate 1001 is coupled to the first conductive metal block 4 through the conduction via 5. The first conductive metal block 4 overlaps the first common-voltage line CVL1. There is a conduction via 6 is formed between the first common-voltage line CVL1 and the first conductive metal block 4. The first conductive metal block 4 is coupled to the first common-voltage line CVL1 through the conduction via 6.

The first N-type doped region 1002, the second N-type doped region 1003, and the third N-type doped region 1004 are formed in the semiconductor region 2. The first N-type doped region 1002 and the second N-type doped region 1003 are respectively formed on two opposite side of the semiconductor region 2, which is directly arranged under the first word line WL1. The second N-type doped region 1003 and the third N-type doped region 1004 are respectively formed on two opposite side of the semiconductor region 2, which is directly arranged under the first common-voltage gate 1001. The first N-type doped region 1002 is coupled to the first select line SL1. The first select line SL1 is coupled to the conduction via 5 formed directly under the first select line SL1. The conduction via 5 penetrates through the gate dielectric layer L. The first select line SL1 is coupled to an external voltage through the conduction via 5.

The P-type semiconductor region 2, the first word line WL1, the first N-type doped region 1002, the second N-type doped region 1003, and the first gate dielectric block 1000 form a first select metal-oxide-semiconductor field effect transistor. The two sidewalls of the first word line WL1 are respectively provided with two first sidewall spacers 1005 that extend to the sidewall of the first gate dielectric block 1000. There are two first N-type lightly-doped drains (LDDs) 1006 which are directly respectively formed under the two first sidewall spacers 1005. When the first select metal-oxide-semiconductor field effect transistor is turned on, a channel region CH1 is formed between the first N-type LDDs 1006.

The P-type semiconductor region 2, the first common-voltage gate 1001, the second N-type doped region 1003, the third N-type doped region 1004, and the first gate dielectric block 1000 form a first metal-oxide-semiconductor field effect transistor. The two sidewalls of the first common-voltage gate 1001 are respectively provided with two second sidewall spacers 1007 that extend to the sidewall of the first gate dielectric block 1000. There are two second N-type lightly-doped drains (LDDs) 1008 which are directly respectively formed under the two second sidewall spacers 1007. When the first metal-oxide-semiconductor field effect transistor is turned on, a channel region CH2 is formed between the second N-type LDDs 1008. However, the first common-voltage gate 1001 can form parasitic capacitances with the second N-type doped region 1003 and the third N-type doped region 1004 to store data.

Figure 4:
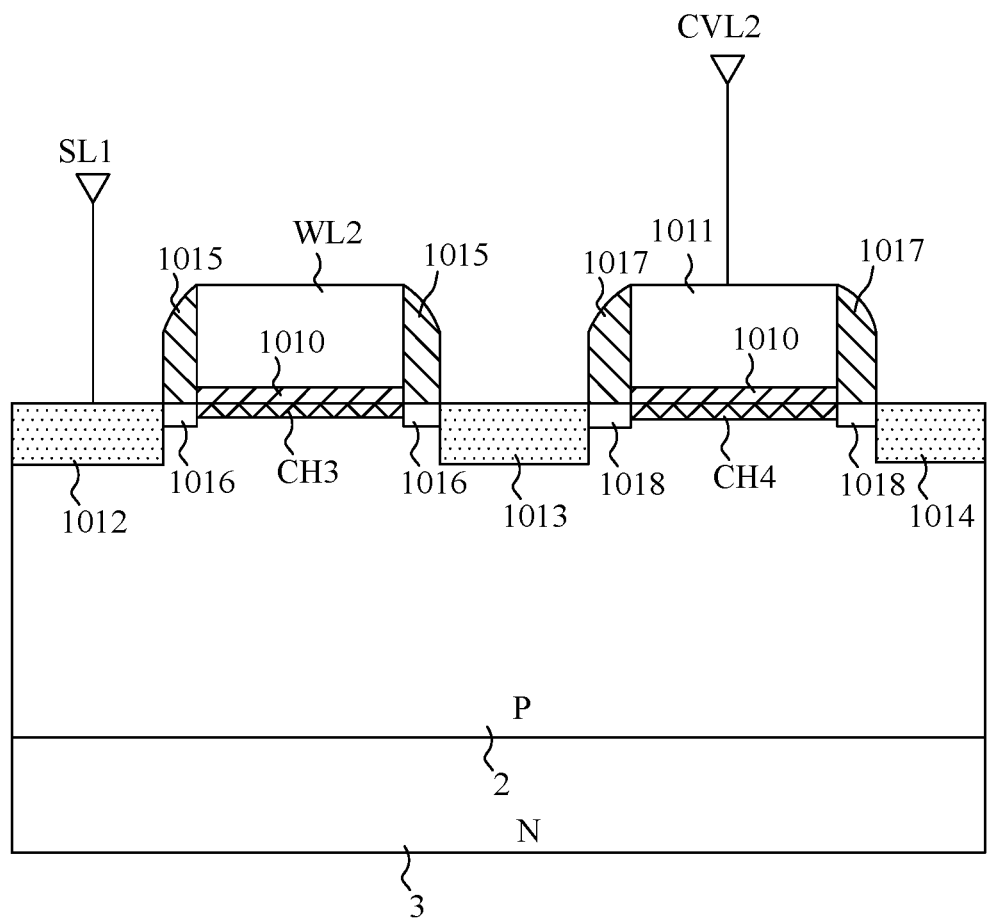
FIG. 4 is a cross-sectional view of a second non-volatile memory cell according to an embodiment of the present invention.

FIG. 4 is a cross-sectional view of a second non-volatile memory cell according to an embodiment of the present invention. Referring to FIG. 4 and FIG. 2, the second non-volatile memory cell 101 is formed in the semiconductor region 2. The second non-volatile memory cell 101 includes a second gate dielectric block 1010, a second common-voltage gate 1011, a fourth N-type doped region 1012, a fifth N-type doped region 1013, and a sixth N-type doped region 1014. The second gate dielectric block 1010 is a part of the gate dielectric layer L in FIG. 1. The second common-voltage gate 1011 and the word lines WL in FIG. 1 are a part of an electrode layer. The second common-voltage gate 1011 may include high dielectric constant metal. The high dielectric constant metal may be, but not limited to, hafnium. The second gate dielectric block 1010 may include a high dielectric constant material. The high dielectric constant material may be, but not limited to, hafnium oxide. The second gate dielectric block 1010 is formed on the semiconductor region 2 and located between the second word line WL2 and the semiconductor region 2. The second common-voltage gate 1011 is formed on the second gate dielectric block 1010 and coupled to the second common-voltage line CVL2. The second common-voltage gate 1011 is closer to the second common-voltage line CVL2 than the second word line WL2. Specifically, the second common-voltage gate 1011 overlaps a second conductive metal block 7. The second conductive metal block 7 is a part of the first conductive metal layer. The conduction via 5 is formed between the second common-voltage gate 1011 and the second conductive metal block 7. The second common-voltage gate 1011 is coupled to the second conductive metal block 7 through the conduction via 5. The second conductive metal block 7 overlaps the second common-voltage line CVL2. The conduction via 6 is formed between the second common-voltage line CVL2 and the second conductive metal block 7. The second conductive metal block 7 is coupled to the second common-voltage line CVL2 through the conduction via 6.

The fourth N-type doped region 1012, the fifth N-type doped region 1013, and the sixth N-type doped region 1014 are formed in the semiconductor region 2. The fourth N-type doped region 1012 and the fifth N-type doped region 1013 are respectively formed on two opposite side of the P-type semiconductor region 2, which is directly arranged under the second word line WL2. The fifth N-type doped region 1013 and the sixth N-type doped region 1014 are respectively formed on two opposite side of the P-type semiconductor region 2, which is directly arranged under the second common-voltage gate 1011. The fourth N-type doped region 1012 is coupled to the first select line SL1.

The P-type semiconductor region 2, the second word line WL2, the fourth N-type doped region 1012, the fifth N-type doped region 1013, and the second gate dielectric block 1010 form a second select metal-oxide-semiconductor field effect transistor. The two sidewalls of the second word line WL2 are respectively provided with two third sidewall spacers 1015 that extend to the sidewall of the second gate dielectric block 1010. There are two third N-type lightly-doped drains (LDDs) 1016 which are directly respectively formed under the two third sidewall the spacers 1015. When second select metal-oxide-semiconductor field effect transistor is turned on, a channel region CH3 is formed between the third N-type LDDs 1016.

The P-type semiconductor region 2, the second common-voltage gate 1011, the fifth N-type doped region 1013, the sixth N-type doped region 1014, and the second gate dielectric block 1010 form a second metal-oxide-semiconductor field effect transistor. The two sidewalls of the second common-voltage gate 1011 are respectively provided with two fourth sidewall spacers 1017 that extend to the sidewall of the second gate dielectric block 1010. There are two fourth N-type lightly-doped drains (LDDs) 1018 which are directly respectively formed under the two fourth sidewall spacers 1017. When the second metal-oxide-semiconductor field effect transistor is turned on, a channel region CH4 is formed between the fourth N-type LDDs 1018. However, the second common-voltage gate 1011 and each of the fifth N-type doped region 1013 and the sixth N-type doped region 1014 form a parasitic capacitor for storing data.

Referring to FIG. 2, the operation of the first non-volatile memory cell 100 and the second non-volatile memory cell 101 is introduced as follows. The operation includes a forming activity, a setting activity, a resetting activity, and a read activity. The forming activity is defined as setting a memory cell to a state ready for storage and operation. The setting activity is defined as setting a memory cell to a logic "1" state. The resetting activity is defined as setting a memory cell to a logic "0" state. The reading activity is defined as reading the storing state of a memory cell.

When the first non-volatile memory cell 100 is selected to perform a forming activity, the first common-voltage line CVL1 s coupled to a middle voltage, the first word line WL1 is coupled to the middle voltage or a low voltage, and the first select line SL1 is coupled to a grounding voltage. The middle voltage is higher than the low voltage and the middle voltage and the low voltage are higher than the grounding voltage. When the first non-volatile memory cell 100 is not selected to perform a forming activity, the first common-voltage line CVL1 is coupled to a middle voltage, the first word line WL1 is coupled to a grounding voltage, and the first select line SL1 is coupled to a first biasing voltage or electrically floating. The middle voltage is higher than the first biasing voltage and the first biasing voltage is higher than the grounding voltage. When the first non-volatile memory cell 100 is selected to perform a setting activity, the first common-voltage line CVL1 is coupled to a half of a middle voltage, the first word line WL1 is coupled to the middle voltage or a low voltage, and the first select line SL1 is coupled to a grounding voltage. The middle voltage is higher than the low voltage and the middle voltage and the low voltage are higher than the grounding voltage. When the first non-volatile memory cell 100 is not selected to perform a setting activity, the first common-voltage line CVL1 is coupled to a half of a middle voltage, the first word line WL1 is coupled to a grounding voltage, and the first select line SL1 is coupled to a first biasing voltage or electrically floating. The middle voltage is higher than the first biasing voltage and the first biasing voltage is higher than the grounding voltage. When the first non-volatile memory cell 100 performs the forming activity and the setting activity, the first common-voltage line CVL1 is directly coupled to an external voltage without passing through decoders. The edge Fowler-Nordheim effect is stressed on the transistor to be turned on, such that the transistor is in a low-impedance state. When the first non-volatile memory cell 100 is selected to perform a resetting activity, the first common-voltage line CVL1 is coupled to a grounding voltage, the first word line WL1 is coupled to a middle voltage or a low voltage, and the first select line SL1 is coupled to a half of the middle voltage. The middle voltage is higher than the low voltage and the middle voltage and the low voltage are higher than the grounding voltage. When the first non-volatile memory cell 100 is not selected to perform a resetting activity, the first common-voltage line CVL1, the first word line WL1, and the first select line SL1 are coupled to a grounding voltage. When the first non-volatile memory cell 100 performs the resetting activity, the edge Fowler-Nordheim effect is stressed on the transistor to be turned off, such that the transistor is in a high-impedance state. When the first non-volatile memory cell 100 is selected to perform a reading activity, the first common-voltage line CVL1 is coupled to a grounding voltage, the first word line WL1 is coupled to a middle voltage or a low voltage, and the first select line SL1 is coupled to a first biasing voltage. The middle voltage is higher than the low voltage. The middle voltage and the low voltage are higher than the first biasing voltage. The first biasing voltage is higher than the grounding voltage. When the first non-volatile memory cell 100 is not selected to perform a reading activity, the first common-voltage line CVL1, the first word line WL1, and the first select line SL1 are coupled to a grounding voltage. When the first non-volatile memory cell 100 performs the reading activity, the corresponding current can be read according to the voltage difference between the two ends of the first non-volatile memory cell 100. If the first non-volatile memory unit cell 100 is in a high-impedance state, a low current is read. If the first non-volatile memory cell 100 is in a low-impedance state, a high current is read.

Based on the forgoing operation, the common-voltage lines are directly coupled to an external voltage without penetrating through decoders and directly coupled to the non-volatile memory cells. Accordingly, the non-volatile memory cells perform a forming activity or a setting activity to reduce the number of decoders and the overall area of the small-area common-voltage multi-write non-volatile memory array. In the forgoing operation, applying a middle voltage or a low voltage to the word line will affect the current of the device. Thus, a middle voltage or a low voltage is applied to the word line according to different designs and conditions. The select lines are biased or electrically floating depending on process characteristics. In addition, the middle voltage is higher than the low voltage and the low voltage is higher than the first biasing voltage. The first biasing voltage is higher than the grounding voltage. Specifically, the middle voltage is equal to the drain-to-source breakdown voltage of the field effect transistor×0.5. The low voltage is equal to the drain-to-source breakdown voltage of the field effect transistor×0.25.

When the second non-volatile memory cell 101 is selected to perform a forming activity, the second common-voltage line CVL2 s coupled to a middle voltage, the second word line WL2 is coupled to the middle voltage or a low voltage, and the first select line SL1 is coupled to a grounding voltage. The middle voltage is higher than the low voltage and the middle voltage and the low voltage are higher than the grounding voltage. When the second non-volatile memory cell 101 is not selected to perform a forming activity, the second common-voltage line CVL2 is coupled to a middle voltage, the second word line WL2 is coupled to a grounding voltage, and the first select line SL1 is coupled to a second biasing voltage or electrically floating. The middle voltage is higher than the second biasing voltage and the second biasing voltage is higher than the grounding voltage. When the second non-volatile memory cell 101 is selected to perform a setting activity, the second common-voltage line CVL2 is coupled to a half of a middle voltage, the second word line WL2 is coupled to the middle voltage or a low voltage, and the first select line SL1 is coupled to a grounding voltage. The middle voltage is higher than the low voltage and the middle voltage and the low voltage are higher than the grounding voltage. When the second non-volatile memory cell 101 is not selected to perform a setting activity, the second common-voltage line CVL2 is coupled to a half of a middle voltage, the second word line WL2 is coupled to a grounding voltage, and the first select line SL1 is coupled to a second biasing voltage or electrically floating. The middle voltage is higher than the second biasing voltage and the second biasing voltage is higher than the grounding voltage. When the second non-volatile memory cell 101 performs the forming activity and the setting activity, the second common-voltage line CVL2 is directly coupled to an external voltage without passing through decoders. The edge Fowler-Nordheim effect is stressed on the transistor to be turned on, such that the transistor is in a low-impedance state. When the second non-volatile memory cell 101 is selected to perform a resetting activity, the second common-voltage line CVL2 is coupled to a grounding voltage, the second word line WL2 is coupled to a middle voltage or a low voltage, and the first select line SL1 is coupled to a half of the middle voltage. The middle voltage is higher than the low voltage and the middle voltage and the low voltage are higher than the grounding voltage. When the second non-volatile memory cell 101 is not selected to perform a resetting activity, the second common-voltage line CVL2, the second word line WL2, and the first select line SL1 are coupled to a grounding voltage. When the second non-volatile memory cell 101 performs the resetting activity, the edge Fowler-Nordheim effect is stressed on the transistor to be turned off, such that the transistor is in a high-impedance state. When the second non-volatile memory cell 101 is selected to perform a reading activity, the second common-voltage line CVL2 is coupled to a grounding voltage, the second word line WL2 is coupled to a middle voltage or a low voltage, and the first select line SL1 is coupled to a second biasing voltage. The middle voltage is higher than the low voltage. The middle voltage and the low voltage are higher than the second biasing voltage. The second biasing voltage is higher than the grounding voltage. When the second non-volatile memory cell 101 is not selected to perform a reading activity, the second common-voltage line CVL2, the second word line WL2, and the first select line SL1 are coupled to a grounding voltage. When the second non-volatile memory cell 101 performs the reading activity, the corresponding current can be read according to the voltage difference between the two ends of the second non-volatile memory cell 101. If the second non-volatile memory unit cell 101 is in a high-impedance state, a low current is read. If the second non-volatile memory cell 101 is in a low-impedance state, a high current is read.

Based on the forgoing operation, the common-voltage lines are directly coupled to an external voltage without penetrating through decoders and directly coupled to the non-volatile memory cells. Accordingly, the non-volatile memory cells perform a forming activity or a setting activity to reduce the number of decoders and the overall area of the small-area common-voltage multi-write non-volatile memory array. In the forgoing operation, applying a middle voltage or a low voltage to the word line will affect the current of the device. Thus, a middle voltage or a low voltage is applied to the word line according to different designs and conditions. The select lines are biased or electrically floating depending on process characteristics. In addition, the middle voltage is higher than the low voltage and the low voltage is higher than the second biasing voltage. The second biasing voltage is higher than the grounding voltage. Specifically, the middle voltage is equal to the drain-to-source breakdown voltage of the field effect transistor×0.5. The low voltage is equal to the drain-to-source breakdown voltage of the field effect transistor×0.25.

Figure 5:
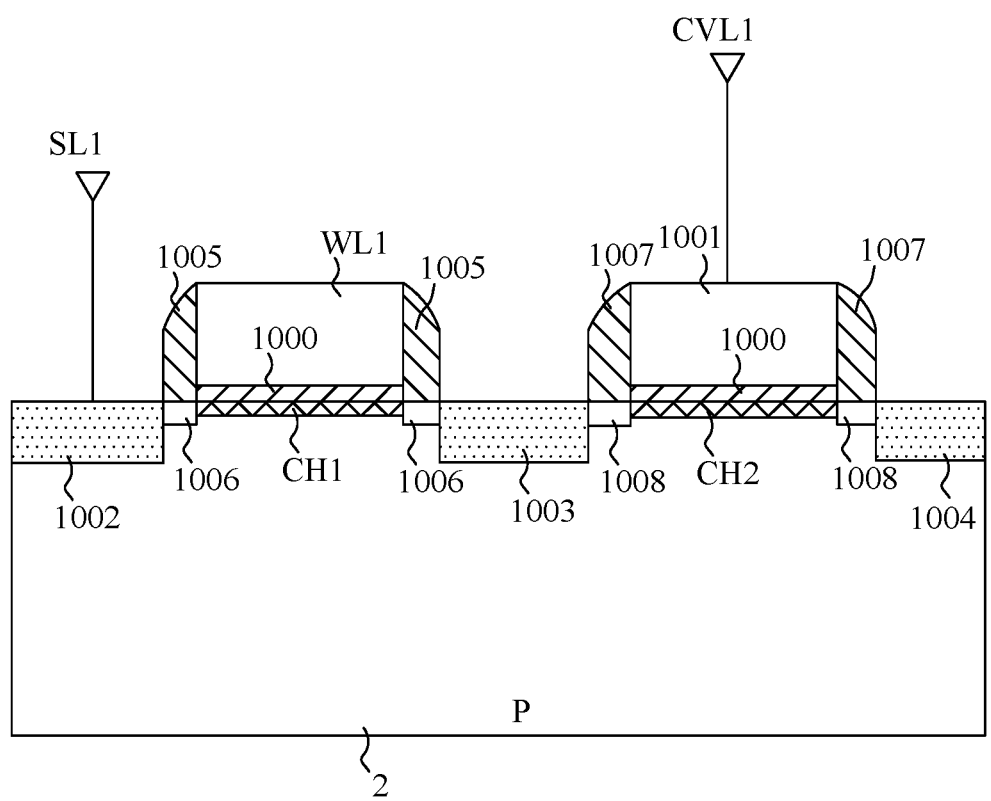
FIG. 5 is a cross-sectional view of a first non-volatile memory cell according to another embodiment of the present invention.
Figure 6:
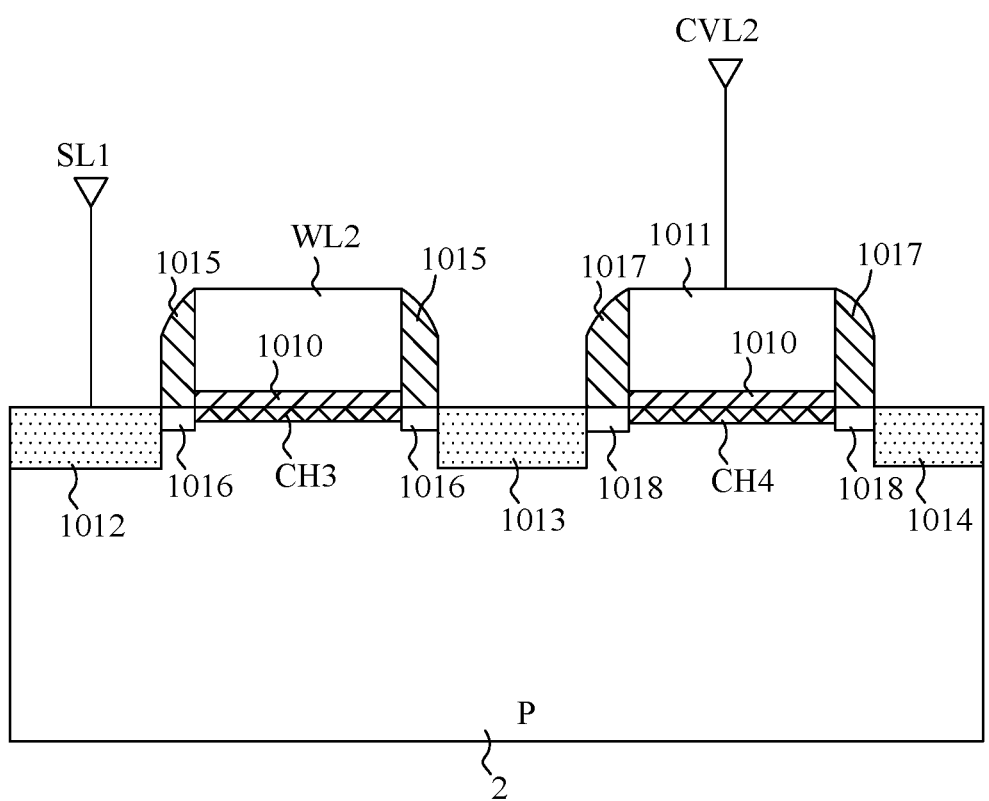
FIG. 6 is a cross-sectional view of a second non-volatile memory cell according to another embodiment of the present invention.

FIG. 5 is a cross-sectional view of a first non-volatile memory cell according to another embodiment of the present invention. FIG. 6 is a cross-sectional view of a second non-volatile memory cell according to another embodiment of the present invention. Referring to FIG. 5 and FIG. 6, the first non-volatile memory cell 100 and the second non-volatile memory cell 101 are formed in the P-type semiconductor region 2 implemented with a P-type semiconductor substrate. The other structures of the he first non-volatile memory cell 100 and the second non-volatile memory cell 101 have been described previously so it will not be reiterated.

According to the embodiments provided above, the small-area common-voltage multi-write non-volatile memory array couples the common-voltage lines together to reduce the number of decoders and the overall area.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A small-area common-voltage multi-write non-volatile memory array comprising:
   a plurality of word lines, arranged in parallel, comprising a first word line and a second word line;
   a plurality of select lines arranged in parallel, wherein the plurality of select lines perpendicular to the plurality of word lines comprise a first select line;
   a plurality of common-voltage lines arranged in parallel, wherein the plurality of common-voltage lines perpendicular to the plurality of select lines are directly coupled together, the plurality of common-voltage lines comprise a first common-voltage line and a second common-voltage line, and the first word line and the second word line are respectively close to the first common-voltage line and the second common-voltage line, wherein the first word line and the second word line are arranged between the first common-voltage line and the second common-voltage line; and a plurality of sub-memory arrays each coupled to two of the plurality of word lines, one of the plurality of select lines, and two of the plurality of common-voltage lines, wherein each of the plurality of sub-memory arrays comprises:
a first non-volatile memory cell coupled to the first word line, the first select line, and the first common-voltage line; and
a second non-volatile memory cell coupled to the second word line, the first select line, and the second common-voltage line.

2. The small-area common-voltage multi-write non-volatile memory array according to claim 1, wherein the first non-volatile memory cell and the second non-volatile memory cell are arranged symmetric to each other.

3. The small-area common-voltage multi-write non-volatile memory array according to claim 2, wherein the first non-volatile memory cell and the second non-volatile memory cell are formed in a P-type semiconductor region, and the first non-volatile memory cell comprises:
a first gate dielectric block, formed on the P-type semiconductor region and arranged between the first word line and the P-type semiconductor region, comprising a high dielectric constant material;
a first common-voltage gate formed on the first gate dielectric block and coupled to the first common-voltage line, wherein the first common-voltage gate is closer to the first common-voltage line than the first word line and the first common-voltage gate comprises high dielectric constant metal; and
a first N-type doped region, a second N-type doped region, and a third N-type doped region formed in the P-type semiconductor region, wherein the first N-type doped region and the second N-type doped region are respectively formed on two opposite side of the P-type semiconductor region, which is directly arranged under the first word line, the second N-type doped region and the third N-type doped region are respectively formed on two opposite side of the P-type semiconductor region, which is directly arranged under the first common-voltage gate, and the first N-type doped region is coupled to the first select line.

4. The small-area common-voltage multi-write non-volatile memory array according to claim 3, wherein the second non-volatile memory cell comprises:
a second gate dielectric block, formed on the P-type semiconductor region and arranged between the second word line and the P-type semiconductor region, comprising a high dielectric constant material;
a second common-voltage gate formed on the second gate dielectric block and coupled to the second common-voltage line, wherein the second common-voltage gate is closer to the second common-voltage line than the second word line and the second common-voltage gate comprises high dielectric constant metal; and
a fourth N-type doped region, a fifth N-type doped region, and a sixth N-type doped region formed in the P-type semiconductor region, wherein the fourth N-type doped region and the fifth N-type doped region are respectively formed on two opposite side of the P-type semiconductor region, which is directly arranged under the second word line, the fifth N-type doped region and the sixth N-type doped region are respectively formed on two opposite side of the P-type semiconductor region, which is directly arranged under the second common-voltage gate, and the fourth N-type doped region is coupled to the first select line.

5. The small-area common-voltage multi-write non-volatile memory array according to claim 4, wherein when the first non-volatile memory cell is selected to perform a forming activity, the first common-voltage line is coupled to a middle voltage, the first word line is coupled to the middle voltage or a low voltage, and the first select line is coupled to a grounding voltage, the middle voltage is higher than the low voltage, and the middle voltage and the low voltage are higher than the grounding voltage.

6. The small-area common-voltage multi-write non-volatile memory array according to claim 4, wherein when the first non-volatile memory cell is not selected to perform a forming activity, the first common-voltage line is coupled to a middle voltage, the first word line is coupled to a grounding voltage, and the first select line is coupled to a biasing voltage or electrically floating, the middle voltage is higher than the biasing voltage, and the biasing voltage is higher than the grounding voltage.

7. The small-area common-voltage multi-write non-volatile memory array according to claim 4, wherein when the first non-volatile memory cell is selected to perform a setting activity, the first common-voltage line is coupled to a half of a middle voltage, the first word line is coupled to the middle voltage or a low voltage, and the first select line is coupled to a grounding voltage, the middle voltage is higher than the low voltage, and the middle voltage and the low voltage are higher than the grounding voltage.

8. The small-area common-voltage multi-write non-volatile memory array according to claim 4, wherein when the first non-volatile memory cell is not selected to perform a setting activity, the first common-voltage line is coupled to a half of a middle voltage, the first word line is coupled to a grounding voltage, and the first select line is coupled to a biasing voltage or electrically floating, the middle voltage is higher than the biasing voltage, and the biasing voltage is higher than the grounding voltage.

9. The small-area common-voltage multi-write non-volatile memory array according to claim 4, wherein when the first non-volatile memory cell is selected to perform a resetting activity, the first common-voltage line is coupled to a grounding voltage, the first word line is coupled to a middle voltage or a low voltage, and the first select line is coupled to a half of the middle voltage, the middle voltage is higher than the low voltage, and the middle voltage and the low voltage are higher than the grounding voltage.

10. The small-area common-voltage multi-write non-volatile memory array according to claim 4, wherein when the first non-volatile memory cell is not selected to perform a resetting activity, the first common-voltage line, the first word line, and the first select line are coupled to a grounding voltage.

11. The small-area common-voltage multi-write non-volatile memory array according to claim 4, wherein when the first non-volatile memory cell is selected to perform a reading activity, the first common-voltage line is coupled to a grounding voltage, the first word line is coupled to a middle voltage or a low voltage, and the first select line is coupled to a biasing voltage, the middle voltage is higher than the low voltage, and the middle voltage and the low voltage are higher than the biasing voltage.

12. The small-area common-voltage multi-write non-volatile memory array according to claim 4, wherein when the first non-volatile memory cell is not selected to perform a reading activity, the first common-voltage line, the first word line, and the first select line are coupled to a grounding voltage.

13. The small-area common-voltage multi-write non-volatile memory array according to claim 4, wherein when the second non-volatile memory cell is selected to perform a forming activity, the second common-voltage line is coupled to a middle voltage, the second word line is coupled to the middle voltage or a low voltage, and the first select line is coupled to a grounding voltage, the middle voltage is higher than the low voltage, and the middle voltage and the low voltage are higher than the grounding voltage.

14. The small-area common-voltage multi-write non-volatile memory array according to claim 4, wherein when the second non-volatile memory cell is not selected to perform a forming activity, the second common-voltage line is coupled to a middle voltage, the second word line is coupled to a grounding voltage, and the first select line is coupled to a biasing voltage or electrically floating, the middle voltage is higher than the biasing voltage, and the biasing voltage is higher than the grounding voltage.

15. The small-area common-voltage multi-write non-volatile memory array according to claim 4, wherein when the second non-volatile memory cell is selected to perform a setting activity, the second common-voltage line is coupled to a half of a middle voltage, the second word line is coupled to the middle voltage or a low voltage, and the first select line is coupled to a grounding voltage, the middle voltage is higher than the low voltage, and the middle voltage and the low voltage are higher than the grounding voltage.

16. The small-area common-voltage multi-write non-volatile memory array according to claim 4, wherein when the second non-volatile memory cell is not selected to perform a setting activity, the second common-voltage line is coupled to a half of a middle voltage, the second word line is coupled to a grounding voltage, and the first select line is coupled to a biasing voltage or electrically floating, the middle voltage is higher than the biasing voltage, and the biasing voltage is higher than the grounding voltage.

17. The small-area common-voltage multi-write non-volatile memory array according to claim 4, wherein when the second non-volatile memory cell is selected to perform a resetting activity, the second common-voltage line is coupled to a grounding voltage, the second word line is coupled to a middle voltage or a low voltage, and the first select line is coupled to a half of the middle voltage, the middle voltage is higher than the low voltage, and the middle voltage and the low voltage are higher than the grounding voltage.

18. The small-area common-voltage multi-write non-volatile memory array according to claim 4, wherein when the second non-volatile memory cell is not selected to perform a resetting activity, the second common-voltage line, the second word line, and the first select line are coupled to a grounding voltage.

19. The small-area common-voltage multi-write non-volatile memory array according to claim 4, wherein when the second non-volatile memory cell is selected to perform a reading activity, the second common-voltage line is coupled to a grounding voltage, the second word line is coupled to a middle voltage or a low voltage, and the first select line is coupled to a biasing voltage, the middle voltage is higher than the low voltage, the middle voltage and the low voltage are higher than the biasing voltage, and the biasing voltage is higher than the grounding voltage.

20. The small-area common-voltage multi-write non-volatile memory array according to claim 4, wherein when the second non-volatile memory cell is not selected to perform a reading activity, the second common-voltage line, the second word line, and the first select line are coupled to a grounding voltage.

21. The small-area common-voltage multi-write non-volatile memory array according to claim 4, wherein the P-type semiconductor region is a P-type semiconductor substrate.

22. The small-area common-voltage multi-write non-volatile memory array according to claim 4, wherein the P-type semiconductor region is a P-type doped well and the P-type doped well is formed in an N-type semiconductor substrate.

* * * * *